Patented Feb. 5, 1946

2,394,367

UNITED STATES PATENT OFFICE 2,394,367

HALOGENATED COMPOSITIONS

Frank M. Clark, Pittsfield, Mass., assignor to General Electric Company, a corporation of New York No Drawing. Application January 7, 1944, Serial No. 517,429

16 Claims. (Cl. 252—66)

The present application is a continuation-in-part of my earlier application Serial No. 417,853, filed November 4, 1941.

This invention comprises compositions which, while of use in various fields, are specially suitable for dielectric purposes, such as the impregnation of electric capacitors. It is one of the objects of my invention to provide compositions whereby electric capacitors may be given improved efficiency and other improved operating characteristics. However, such compositions are not to be considered as being applicable only to the capacitor field. They may be used for other purposes, for example, for application to electric cables and high voltage bushings, or as lubricants or hydraulic fluids.

My invention comprises compositions which contain as essential ingredients both halogenated polyphenyl hydrocarbon and nitrated aryl polynuclear hydrocarbon. For example, compositions of chlorinated diphenyl and orthonitro diphenyl (unchlorinated) are illustrative of my invention.

The latter compound is a crystalline solid resulting from the nitration of diphenyl, for example, by treatment with a mixture of nitric and sulphuric acids at about 35 to 40° C. A process of preparing such compound is described in Industrial and Engineering Chemistry, volume 22 (1930), page 32. Its characteristics are not such as to obviously recommend it for use as a capacitor dielectric. Its dielectric constant is relatively low under ordinary conditions and its power factor in capacitors is relatively high.

Chlorinated diphenyl capacitors, which are described in my prior Patent No. 2,041,594, patented May 19, 1936, although highly efficient at ordinary temperatures, possess the disadvantageous property of being subject to a considerable fall of capacity at low temperatures, that is, when the ambient temperature is reduced to about 0° C. or lower. For example, a capacitor unit, which I shall refer to as a standard for comparison and which contains kraft paper spacers impregnated with pentachlor diphenyl, has a capacity of 3 microfarads at 25° C. Its capacity is reduced 25 per cent (that is, to 2.25 microfarads) when the temperature is lowered to —5° C. This substantial reduction of capacity is a serious disadvantage for some kinds of service.

Pentachlor diphenyl, in common with other halogenated diphenyl compounds as ordinarily obtained, is a mixture of isomers. It contains also a relatively small proportion of both lower and higher chlorination products. The pentachlor compound which is in commercial use as a capacitor impregnant is a viscous liquid at room temperature and becomes too viscous to pour at temperatures between 10° and 0° C. The congealing temperature of any particular product depends on the proportion of its constituents which vary somewhat. Possibly the congelation of liquid chlorinated diphenyl accounts for the fall of capacity of the capacitors which are impregnated therewith.

Orthonitro diphenyl is a solid material melting at about 37.5° C. The combination of this solid with the viscous pentachlor diphenyl might well be expected to have a congealing temperature even higher than pentachlor diphenyl. Unexpectedly, however, the congealing temperature of such mixtures is lower, as shown by the following table:

TABLE I

Properties of compositions of pentachlor diphenyl and nitrodiphenyl

| Parts by weight pentachlor diphenyl | Parts by weight nitrodiphenyl | Pour point centigrade | Viscosity at 37.8° C. seconds Saybolt |
|---|---|---|---|
| 100 | ----- | +10 | 2,000 |
| 75 | 25 | +2 | 313 |
| 50 | 50 | —7 | 143 |
| 25 | 75 | —12 | 96 |
| ----- | 100 | +37.5 | 77 |

At room temperature the dielectric constant of orthonitro diphenyl is about 3 and of pentachlor diphenyl is about 5. In view of the fact that the dielectric constant of nitrodiphenyl is lower under ordinary conditions than the dielectric constant of pentachlor diphenyl, it might reasonably be expected that combinations or blends of these two products would have lower resultant dielectric constants than the chlorinated diphenyl constituents. I have discovered that this is not true, the dielectric constant of the mixture being higher than the dielectric constant of either constituent, as will be observed from the following table:

TABLE II

| Per cent pentachlor diphenyl | Per cent nitrodiphenyl | Dielectric constant at 25° C. |
|---|---|---|
| 100 | ----- | 5 |
| 75 | 25 | 9 |
| 50 | 50 | 11.7 |
| 25 | 75 | 14.1 |
| ----- | 100 | 3 |

Capacitors impregnated with blends of these two ingredients in accordance with my present invention have higher capacities than capacitors impregnated solely with chlorinated diphenyl. More surprisingly still, they are more insensitive to low temperatures. Although capacitors impregnated with such mixtures have somewhat higher power factors, this disadvantage is not serious enough to offset the other advantageous properties.

Aluminum foil capacitors containing kraft paper separators, when impregnated with pentachlor diphenyl of a chosen standard size, have an electrical capacity of 3 microfarads and a power factor of about .3 per cent at 25° C. On the other hand, capacitors of this standard size when treated with, for example, the 50:50 mixture of Table I, have the following properties:

TABLE III

| | Temperature | | | | | |
|---|---|---|---|---|---|---|
| | —25° C. | 0° C. | 25° C. | 50° C. | 75° C. | 100° C. |
| Capacity | 4.01 | 4.00 | 3.91 | 3.88 | 3.83 | 3.79 |
| Per cent power factor | 2.67 | .50 | .68 | .49 | .49 | .74 |

Over the wide temperature range of —25 to 100° C. the capacity varies only 5.5 per cent, and in all cases is higher than the capacitors impregnated with pentachlor diphenyl.

Not only do capacitors which are impregnated solely with chlorinated diphenyl lose 25 per cent of their capacity when cooled to about —5° C., but the capacity of such capacitors when raised from 25 to 100° C. falls about 6.8 per cent.

At 25° C. the capacity of the standard capacitors is about 30 per cent higher when the equal parts mixture is substituted for the pentachlor diphenyl. It should be observed that at an operating temperature of 25 to 100° C. the capacity of such units when impregnated with a composition embodying my invention is higher, the power factors being well below one per cent. Although for illustrative purposes comparisons have been made between specific compositions, similar advantages are obtained over a wide range of compositions and proportions of these two ingredients. The dielectric constant of such mixtures is always higher than the dielectric constant of either one of the ingredients.

For example, a dielectric composition comprising a mixture of 90 parts by weight of pentachlor diphenyl and 10 parts by weight of orthonitro diphenyl has a dielectric constant equal to 5.5, and capacitors (of the type already described) impregnated therewith have a capacity of 3.4 microfarads, an increase equal to approximately 11 per cent over the capacity of the same type of capacitor impregnated with unmodified pentachlor diphenyl.

A composition consisting by weight of about 95 per cent of pentachlor diphenyl and about 5 per cent of ortho-nitro diphenyl has a lower, and hence more favorable, power factor from room temperatures up to about 50° C. than compositions which contain 25 per cent and 50 per cent, respectively, of nitrodiphenyl. As above stated, the power factor obtained with the 50:50 mixture at 25° C. is .68. The power factor at 25° C. with the above 95:5 mixture is .44.

The capacity of the standard capacitor containing an impregnant made up of the above composition, including 5 per cent of the orthonitro diphenyl, is higher due to the presence of the orthonitro diphenyl than the capacity of the standard capacitor containing only pentachlor diphenyl, although the capacity is not so high as obtainable when the content of the nitro compound is higher.

Even smaller amounts of orthonitro diphenyl have a marked beneficial effect when added to halogenated polyphenyl capacitor impregnants, particularly in capacitors which are operated at temperatures above room temperature.

Capacitors containing pentachlor diphenyl and constructed in accordance with my prior Patent 2,041,594 operate with long lives under operating conditions which limit their temperatures to about 75 to 80° C. If, however, their operating temperatures approach the range of about 90 to 100° C., the power factor rises and their useful life becomes reduced. When about one per cent by weight of orthonitro diphenyl is associated with the pentachlor diphenyl, the life of such capacitors is materially lengthened. At 100° C. the life was found to be about fifty-seven times longer when one per cent of the nitro compound was present in the pentachlor diphenyl impregnant. Smaller amounts of the nitro compound are effective in increasing the life of the capacitor. Capacitors impregnated with a mixture containing 99¾ per cent pentachlor diphenyl and ¼ per cent orthonitro diphenyl have a life at 100° C. ambient temperature at least four times longer than normally obtained with capacitors impregnated with unmodified pentachlor diphenyl.

Halogenated polyphenyl dielectric impregnants advantageously may be associated or blended with other polynuclear nitro compounds as, for example, dinitrodiphenyl and alpha nitronaphthalene.

The following table shows the physical properties of mixtures of pentachlor diphenyl and 2-4' dinitrodiphenyl:

TABLE IV

| Per cent pentachlor diphenyl | Per cent dinitrodiphenyl | Pour point centigrade | Dielectric constant at 25° C. |
|---|---|---|---|
| 100 | -- | +10 | 5 |
| 75 | 25 | +14 | 13.8 |
| 50 | 50 | +12 | 25.4 |
| 25 | 75 | +14 | 33.8 |
| -- | 100 | +13 | 6.8 |

The chosen standard capacitor units impregnated, for example, with an equal parts (50:50) mixture have the following characteristics, the high capacity and stability over a wide range of temperatures being noteworthy.

TABLE V

| | Temperature | | | | |
|---|---|---|---|---|---|
| | —10° C. | 0° C. | 25° C. | 75° C. | 100° C. |
| Capacity | 4.70 | 4.63 | 4.68 | 4.67 | 4.65 |
| Per cent power factor | 2.4 | 1.88 | .56 | .89 | .82 |

It should be noted that over a range of —10° C. to 100° C. the increase in capacity over the conventional chlorinated diphenyl capacitors is over 50 per cent.

The following table shows the physical properties of mixtures of pentachlor diphenyl and alpha nitronaphthalene:

TABLE VI

| Per cent pentachlor diphenyl | Per cent nitronaphthalene | Pour point centigrade | Viscosity in seconds at 100° C. | Dielectric constant at 25° C. |
|---|---|---|---|---|
| 100 | -- | 10 | 48 | 5 |
| 75 | 25 | —11 | 41 | 9.2 |
| 50 | 50 | 28–30 | 38 | 13.8 |
| 25 | 75 | 35–40 | 36 | 16.8 |
| -- | 100 | 51 | 36 | 4.2 |

The standard capacitor units impregnated with an equal parts mixture have the following characteristics:

TABLE VII

| | Temperature | | | | | |
|---|---|---|---|---|---|---|
| | −25° C. | 0° C. | 25° C. | 50° C. | 75° C. | 100° C. |
| Capacity | 3.2 | 4.28 | 4.21 | 4.16 | 4.10 | 4.00 |
| Per cent power factor | 3.5 | .69 | .59 | .54 | .60 | .84 |

Although the examples given in Table VI include compositions containing 25 to 75 per cent of alpha nitronaphthalene, the present invention is not restricted to this range. For example, compositions of chlorinated diphenyl containing 5 per cent or less of alpha nitronaphthalene have superior dielectric properties in capacitors at operating temperatures in the range of about 90 to 100° C. or higher. Capacitors containing pentachlor diphenyl and about one per cent of alpha nitronaphthalene when operated at 400 volts direct current at 110° C. have a life several times longer at this temperature than capacitors containing pentachlor unassociated with such aryl nitro compound. Amounts as low as ¼ per cent are effective in producing greater stability at elevated temperatures.

The stability in capacity over a wide temperature range is noteworthy. These capacitors decrease only 6.5 per cent in capacity from 0° to 100° C., although the congealing temperature of the mixture is relatively high. On the other hand, the improvement in capacity is almost as high as that characterizing the dinitrodiphenyl blends.

Various other ingredients may be added to compositions comprising halogenated polyphenyl and nitrated polynuclear aryl hydrocarbons without losing the advantages obtained, and in fact the addition of other ingredients may be advantageous.

For example, compositions containing tri- and tetrachlor diphenyl benzene, in addition to the ordinary chlorinated diphenyl and the orthonitro diphenyl, have a lower power factor and higher capacity than compositions devoid of the chlorinated diphenyl benzene and containing substantially the same amount of orthonitro diphenyl. This is illustrated by the following example:

| Ingredients | Percentage |
|---|---|
| Pentachlor diphenyl | 60 |
| Orthonitro diphenyl | 25 |
| Trichlor diphenyl benzene | 9 |
| Tetrachlor diphenyl benzene | 6 |

This composition has the following physical characteristics:

Resistivity at 100° C _____ 82×10$^9$ ohms per cm.$^3$
Dielectric constant at 25° C _____ 8.09
Dielectric constant at 100° C _____ 6.46
Pour point _____ −1° C.
Viscosity at 98.9° C _____ 45 seconds Saybolt A dielectric in a capacitor made up of this composition has a decided advantage due to lower power factor from room temperature up to about 50° C. At 25° C. the power factor is about .44 per cent. As noted in Table III, the power factor obtained with the 50:50 blend is .68 per cent. There is no appreciable difference at higher temperatures between this composition and the 50:50 and 25:75 mixtures listed in Table II. The capacity is about 3.7 microfarads at 25° C. in the case of this four-element mixture.

Instead of chlorinated diphenyl, and pentachlor diphenyl in particular, other equivalent compounds may be used, as, for example, halogenated compounds of diphenyl methane, diphenyl ethane (dibenzyl), diphenyl ketone, and of substitution products thereof, such as diphenyl benzene. Similarly, other nitro compounds of various diphenyl and other polynuclear compounds can be blended with halogenated polynuclear compounds, as, for example, nitrodibenzyl or nitrodiphenyl benzene, in order to obtain the advantages of my invention.

It is also practicable to add an aliphatic hydrocarbon, such as mineral oil, to the various disclosed compositions without losing their distinctive advantages. The following compositions are illustrative:

EXAMPLE A

| Ingredient | Percentage by weight |
|---|---|
| Pentachlor diphenyl | 70 |
| Alpha nitronaphthalene | 25 |
| Mineral oil, viscosity 100 seconds Saybolt at 37.8° C | 5 |

This oil, having a viscosity of 100 seconds Saybolt Universal at 100° F., may be the kind used in lead-covered electric cables.

Characteristics

Resistivity _____ 230×10$^9$ ohms per cm.$^3$
Dielectric constant at 25° C _____ 9.19
Dielectric constant at 100° C _____ 7.18
Pour point _____ −14° C.
Viscosity _____ 25° C.

This composition, when filling the standard capacitor such as described, results in the following capacitor characteristics:

| Temp., deg. C. | Per cent power factor 60 cycle | Capacity 60 cycle |
|---|---|---|
| 25 | 0.52 | 4.28 |
| 50 | .53 | 4.23 |
| 75 | .67 | 4.12 |
| 100 | 1.00 | 4.03 |

EXAMPLE B

| Ingredient | Percentage by weight |
|---|---|
| Pentachlor diphenyl | 70 |
| Dinitro diphenyl | 25 |
| Mineral oil (such as above specified) | 5 |

Characteristics

Resistivity at 25° C _____ 1930 × 10$^9$ ohms per cm.$^3$
Dielectric constant at 25° C _____ 14.1
Dielectric constant at 100° C _____ 10.4
Pour point _____ 8° C
Viscosity at 25° C _____ 7800 seconds Saybolt
Viscosity at 50° C _____ 370 seconds Saybolt
Viscosity at 100° C _____ 47 seconds Saybolt Standard capacitor dielectric values

| Temp., deg. C. | Per cent power factor 60 cycle | Capacity 60 cycle |
|---|---|---|
| 25 | 0.63 | 4.84 |
| 50 | 1.00 | 4.80 |
| 75 | 1.09 | 4.72 |
| 100 | 1.19 | 4.67 |

What I claim as new and desire to secure by Letters Patent of the United States is:

1. A dielectric composition consisting essentially of halogenated diphenyl and a nitrated polynuclear aryl hydrocarbon, the amount of said nitrated polynuclear hydrocarbon being at least as high as ¼ per cent and not materially exceeding 75 per cent, the latter ingredient being effective to increase substantially the capacity and life at temperatures as high as about 90° C. of a capacitor impregnated with such composition.

2. Compositions suitable for dielectric purposes consisting of liquid mixtures of orthonitro diphenyl and chlorinated diphenyl, said orthonitro diphenyl constituting within the limits of about ¼ to 75 per cent by weight of said composition.

3. Compositions of matter comprising halogenated polyphenyl compound and nitrated polynuclear aryl hydrocarbon, the latter ingredient constituting about ¼ to ten per cent by weight of such composition.

4. Compositions of matter comprising as substantial and essential ingredients chlorinated diphenyl and nitrated polynuclear aryl hydrocarbons, the latter ingredient constituting about one to five per cent by weight of such composition.

5. Compositions of matter comprising chlorinated diphenyl and nitrated diphenyl, the latter ingredient constituting about 5 to 10 per cent by weight of such composition.

6. Dielectric compositions suitable for use in electric capacitors consisting by weight of about 75 to 25 parts of pentachlor diphenyl and about 25 to 75 parts of orthonitro diphenyl.

7. Compositions suitable for dielectric purposes consisting of liquid mixtures comprising chlorinated aryl hydrocarbons and including about 5 to 75 per cent by weight of nitrated polynuclear hydrocarbon compound and at least about 25 per cent of chlorinated diphenyl.

8. A dielectric material consisting by weight of liquid mixtures of about 5 to 50 per cent orthonitro diphenyl and 95 to 50 per cent pentachlor diphenyl.

9. A dielectric material consisting of a liquid mixture of substantially equal parts by weight of orthonitro diphenyl and pentachlor diphenyl.

10. Compositions suitable for dielectric purposes consisting of chlorinated diphenyl and about 25 to 50 per cent by weight of mononitro diphenyl, said compositions having dielectric constants higher than 5.

11. Compositions which are suitable for dielectric purposes comprising a liquid mixture of about 60 parts of chlorinated diphenyl, about 25 parts of orthonitro diphenyl, and about 15 parts of chlorinated diphenyl benzene.

12. A liquid composition which is suitable for dielectric purposes comprising a mixture consisting by weight of about 60 parts pentachlor diphenyl, 25 parts orthonitro diphenyl, 9 parts trichlor diphenyl benzene and 6 parts tetrachlor diphenyl benzene, said composition having a dielectric constant at 25° C. of about 8, and having a pour point of about −1° C.

13. Compositions suitable for dielectric purposes comprising about 25 to 75 parts of alpha nitronaphthalene and about 75 to 25 parts of chlorinated diphenyl.

14. Compositions suitable for dielectric purposes comprising by weight about 25 per cent of alpha nitronaphthalene, about 70 per cent of chlorinated diphenyl and about 5 per cent of mineral hydrocarbon oil.

15. Compositions which are suitable for dielectric purposes consisting of halogenated polyphenyl and about ¼ to 5 per cent of alpha nitronaphthalene.

16. Compositions which are suitable for dielectric purposes consisting of chlorinated diphenyl and about one per cent of alpha nitronaphthalene.

FRANK M. CLARK.